3,795,582
INHIBITION OF AGGREGATION OF BLOOD PLATELETS

Don N. Harris, Somerset, and Marie B. Phillips, Highland Park, N.J., assignors to E. R. Squibb & Sons, Inc., Princeton, N.J.
No Drawing. Filed Jan. 31, 1973, Ser. No. 328,185
Int. Cl. A61k 27/00
U.S. Cl. 195—1.8                   5 Claims

ABSTRACT OF THE DISCLOSURE

The activity of $PGE_1$ in inhibiting aggregation of blood platelets is enhanced by employing the $PGE_1$ in combination with 1-ethyl-4-isopropylidenehydrazino-1H-pyrazolo[3,4-b]pyridine-5-carboxylic acid, ethyl ester.

OBJECTS OF THE INVENTION

It is an object of the present invention to provide a compound which potentiates the effect of $PGE_1$ in inhibiting the aggregation of blood platelets on storage. Another object is to provide blood platelet compositions having reduced tendency to aggregate. A further object is to provide a method for inhibiting the tendency of blood platelets to aggregate. These and other objects of the present invention will be apparent from the following description.

SUMMARY OF THE INVENTION

It has now been found that the effectiveness of prostaglandin $E_1$ ($PGE_1$) in inhibiting the aggregation of blood platelets is potentiated by employing the $PGE_1$ in combination with 1-ethyl 4-isopropylidenehydrazino-1H-pyrazolo[3,4-b]pyridine-5-carboxylic acid, ethyl ester.

BACKGROUND OF THE INVENTION

During the high-speed centrifugation of platelet-rich plasma, massive aggregates are formed. Prostaglandin $E_1$ ($PGE_1$) is one of the most potent inhibitors of platelet aggregation known. The use of $PGE_1$ in improving the preparation of human platelet concentrates from plasma rich in platelets and from whole blood is described by Shio et al., Science, 175: 536, 1972. Shio et al. found that the addition of $PGE_1$ at a concentration of $10^{-8}$ to $10^{-7}$ molar to platelet-rich plasma or whole blood before platelet extraction inhibited aggregation.

The use of $PGE_1$ in preventing clumping of platelets in whole blood either at room temperature or in the cold and with a variety of anticoagulants is described by Becker et al., Science, 175: 538, 1972.

The addition of $PGE_1$ at a concentration of $2.2 \times 10^{-8}$ M to whole blood does not impair the effectiveness of fresh platelet concentrates and significantly improves platelet recovery in vitro according to Valeri et al., Science, 175: 539, 1972.

DETAILED DESCRIPTION

The present invention is directed to a compound and method of potentiating the effectiveness of prostaglandin $E_1$ in inhibiting the aggregation of blood platelets. Such potentiation is effected by employing $PGE_1$, in combination with 1-ethyl-4-isopropylidene-hydrazino-1H-pyrazolo[3,4-b]pyridine-5-carboxylic acid, ethyl ester.

The inhibition of blood platelet aggregation according to the present invention is obtained by contacting blood platelets with a concentration of from about $10^{-6}$ molar to about $10^{-9}$ molar $PGE_1$ in combination with from about 1 mM. to about 4 mM. of 1-ethyl-4-isopropylidene-hydrazino-1H-pyrazolo[3,4-b]pyridine-5-carboxylic acid, ethyl ester.

The following method is used to determine activity of the compounds of the present invention:

Aggregation of blood platelets.—Platelet aggregation is studied photometrically using a Born MKIII aggregometer as described by Born, Nature, Lond., 194 (1962). Platelet rich plasma (PRP) is prepared by centrifuging freshly drawn human blood 200 g. for 10 minutes at 24° C. In a typical experiment, PRP is preincubated for 5 minutes at 37° C., the compound of the invention is then added and the mixture incubated for one minute. After the addition of prostaglandin $E_1$ ($PGE_1$) and an additional 40 seconds of mixing, ADP (20 μM.) is added and the optical transmission recorded for three minutes. The rate of change, or initial velocity, of the optical transmission is measured by determining the slope of the steepest part of the curve in mm./minute.

The following examples illustrate the present invention without, however, limiting the same thereto.

EXAMPLES 1–4

Following the foregoing procedure, the following data are obtained when platelet rich plasma is employed as the source of blood platelets.

| Compound added | Concentration | Rate, mm./minute | Percent inhibition |
|---|---|---|---|
| 1... ADP | $2 \times 10^{-5}$M | 258 | 0 |
| 2... 1-ethyl-4-isopropylidenehy-drazino-1H-pyrazolo[3,4-b]-pyridine-5-carboxylic acid, ethyl ester. | $1 \times 10^{-3}$M | 188 | 27 |
| 3... $PGE_1$ | $6.7 \times 10^{-8}$M | 202 | 22 |
| 4... $PGE_1$ plus 1-ethyl-4-isopropyl-idenehydrazino-1H-pyrazolo-[3,4-b]pyridine-5-carboxylic acid, ethyl ester. | (¹) | 71 | 73 |

¹ Each ingredient used in same concentration as used in Examples 2 and 3, respectively.

EXAMPLE 5

Results similar to that obtained in Example 4 are obtained when the source of blood platelets is whole human blood or platelet concentrates.

What is claimed is:
1. A method of inhibiting aggregation of human blood platelets which comprises contacting the platelets with from about $10^{-6}$ to about $10^{-9}$ molar $PGE_1$ and from about 1 to about 4 mM. of 1-ethyl-4-isopropylidene-hydrazino-1H-pyrazolo[3,4-b]pyridine-5-carboxylic acid, ethyl ester.
2. A method according to claim 1 wherein the human blood platelets are in whole human blood.
3. A method according to claim 1 wherein the human blood platelets are in platelet rich plasma.
4. A method according to claim 1 wherein the human blood platelets are in platelet concentrates.
5. A composition for inhibiting aggregation of human blood platelets which comprises $PGE_1$ and 1-ethyl-4-isopropylidenehydrazino-1H-pyrazolo[3,4-b]pyridine-5-carboxylic acid, ethyl ester, the composition containing each ingredient in an amount effective to inhibit blood platelet aggregation.

References Cited
UNITED STATES PATENTS
3,735,005    5/1973    Shio et al. _____ 195—1.8

RICHARD L. HUFF, Primary Examiner